United States Patent
Shane et al.

(10) Patent No.: US 10,674,662 B2
(45) Date of Patent: Jun. 9, 2020

(54) AGRICULTURAL WINDROW CHUTE WITH ROLLING EDGE

(71) Applicant: CNH Industrial America LLC, New Holland, PA (US)

(72) Inventors: Nicholas S. Shane, Bennett, IA (US); Craig E. Murray, Davenport, IA (US); Justin L. Montenguise, Bettendorf, IA (US); Stefaan Desmet, Vosselare (BE); Yvan Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/581,679

(22) Filed: Apr. 28, 2017

(65) Prior Publication Data

US 2018/0310479 A1    Nov. 1, 2018

(51) Int. Cl.
| | |
|---|---|
| *A01D 41/12* | (2006.01) |
| *A01D 87/00* | (2006.01) |
| *A01D 41/06* | (2006.01) |
| *A01D 43/08* | (2006.01) |
| *A01F 12/40* | (2006.01) |

(52) U.S. Cl.
CPC ......... *A01D 41/1243* (2013.01); *A01D 41/06* (2013.01); *A01D 43/08* (2013.01); *A01D 87/0007* (2013.01); *A01F 12/40* (2013.01)

(58) Field of Classification Search
CPC .... A01D 87/0007; A01D 41/06; A01D 41/10; A01D 41/1243; A01D 43/08; A01D 43/005; A01D 43/10; A01D 43/102; A01D 57/28; A01D 57/30; A01B 43/005; A01F 12/40; A01F 29/12
See application file for complete search history.

(56) References Cited

U.S. PATENT DOCUMENTS

| | | | | |
|---|---|---|---|---|
| 2,609,080 | A | * | 9/1952 | Overman ........... A01D 41/1243 198/315 |
| 4,947,626 | A | * | 8/1990 | Maier ..................... A01D 43/10 56/364 |
| 5,930,988 | A | | 8/1999 | Hanson |
| 5,941,768 | A | * | 8/1999 | Flamme ................. A01D 43/07 209/135 |

(Continued)

FOREIGN PATENT DOCUMENTS

| | | | |
|---|---|---|---|
| EP | 0631717 A1 | * 1/1995 | ......... A01D 41/1243 |
| WO | 2016/105457 A2 | 6/2016 | |

OTHER PUBLICATIONS

Extended European Search Report for Application No. EP18169751.7 dated Jul. 18, 2018 (13 pages).

*Primary Examiner* — Alicia Torres
*Assistant Examiner* — Adam J Behrens
(74) *Attorney, Agent, or Firm* — Patrick Sheldrake; Peter Zacharias

(57) ABSTRACT

An agricultural vehicle includes a chassis; a header carried by the chassis and configured to cut crop material; a chopper carried by the chassis downstream of the header; and a windrow assembly carried by the chassis downstream of the chopper. The windrow assembly includes a windrow chute defining a leading edge downstream from the chopper and a trailing edge downstream from the leading edge; and a roller associated with the leading edge to form an active leading edge of the windrow chute during rotation.

12 Claims, 5 Drawing Sheets

(56) References Cited

U.S. PATENT DOCUMENTS

| | | | |
|---|---|---|---|
| 6,688,972 B2 | 2/2004 | Büermann et al. | |
| 7,455,584 B2* | 11/2008 | Farley | A01D 41/1243 |
| | | | 460/111 |
| 9,259,011 B2* | 2/2016 | Thomas | B02C 18/225 |
| 2005/0277454 A1* | 12/2005 | Couture | A01D 41/1243 |
| | | | 460/111 |
| 2005/0282602 A1 | 12/2005 | Redekop et al. | |
| 2011/0237316 A1* | 9/2011 | Isaac | A01D 41/1243 |
| | | | 460/111 |
| 2013/0324199 A1* | 12/2013 | Roberge | A01D 41/1243 |
| | | | 460/111 |
| 2016/0106024 A1* | 4/2016 | Ricketts | A01D 41/1243 |
| | | | 460/111 |
| 2016/0135377 A1 | 5/2016 | Ballegeer et al. | |
| 2016/0192587 A1* | 7/2016 | Ballegeer | A01D 41/1243 |
| | | | 460/111 |
| 2017/0079207 A1* | 3/2017 | Puryk | A01D 41/1243 |
| 2018/0007831 A1* | 1/2018 | Ballegeer | A01D 41/1243 |

\* cited by examiner

AGRICULTURAL WINDROW CHUTE WITH ROLLING EDGE

FIELD OF THE INVENTION

The present invention relates to agricultural vehicles, and, more particularly, to agricultural vehicles which include windrow chutes.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobbs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

To windrow the crop residue, the residue is directed to a windrow assembly held at the rear of the vehicle. The windrow assembly includes a chute the residue travels along and vanes or a different mechanism for controlling the width of the windrow that is left on the field.

One particular problem that occurs when windrowing crop residue is hair pinning at the leading edge of the windrow chute. Since the leading edge must be properly spaced to protect the windrowed residue from being disturbed by the wind generated by the spreader, catch all straw coming from the threshing rotor and not catch chaff coming from the cleaning system, some of the crop residue passing the leading edge will tend to accumulate on the leading edge. Once some crop residue accumulates on the leading edge, the accumulation at the leading edge can quickly build up and disrupt operation of the combine.

What is needed in the art is a windrow assembly for an agricultural vehicle which is less prone to material accumulation at the leading edge.

SUMMARY OF THE INVENTION

In accordance with an aspect of the present invention, there is provided a windrow assembly with a windrow chute having a leading edge and a roller associated with the leading edge to form an active leading edge of the windrow chute during rotation.

In accordance with another aspect of the present invention, there is provided an agricultural vehicle including a chassis; a header carried by the chassis and configured to cut crop material; a chopper carried by the chassis downstream of the header; and a windrow assembly carried by the chassis downstream of the chopper. The windrow assembly includes a windrow chute defining a leading edge downstream from the chopper and a trailing edge downstream from the leading edge; and a roller associated with the leading edge to form an active leading edge of the windrow chute during rotation.

In accordance with yet another aspect of the present invention, there is provided a windrow assembly including a windrow chute defining a leading edge and a trailing edge opposite the leading edge; and a roller associated with the leading edge to form an active leading edge of the windrow chute during rotation.

An advantage of the agricultural vehicle and windrow assembly described herein is that the formed active leading edge discourages crop residue from accumulating at the leading edge of the windrow chute.

Another advantage of an embodiment of the agricultural vehicle and windrow assembly described herein is that the roller can be equipped with at least one blade so the roller does not require additional power to rotate.

Still another advantage of an embodiment of the agricultural vehicle and windrow assembly described herein is that the roller can be equipped with at least one beater rod to break up and free crop residue which may accumulate on the leading edge.

BRIEF DESCRIPTION OF THE DRAWINGS

The above-mentioned and other features and advantages, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
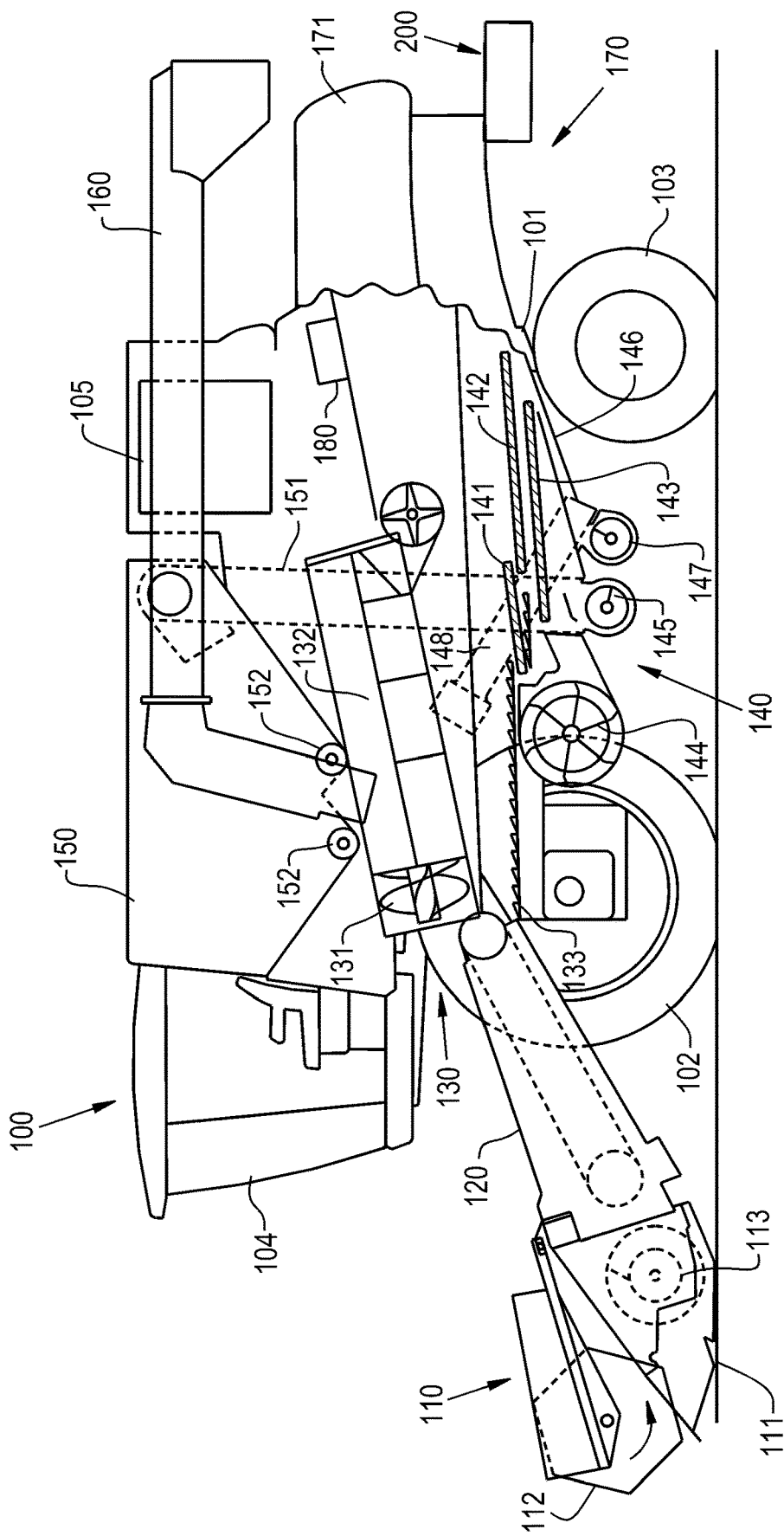
FIG. 1 is a side view of an agricultural vehicle, in accordance with an exemplary embodiment of the present invention.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Optionally, the chaff and/or straw can proceed through a chopper 180 to be further processed into even smaller particles before discharge out of the combine 100. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
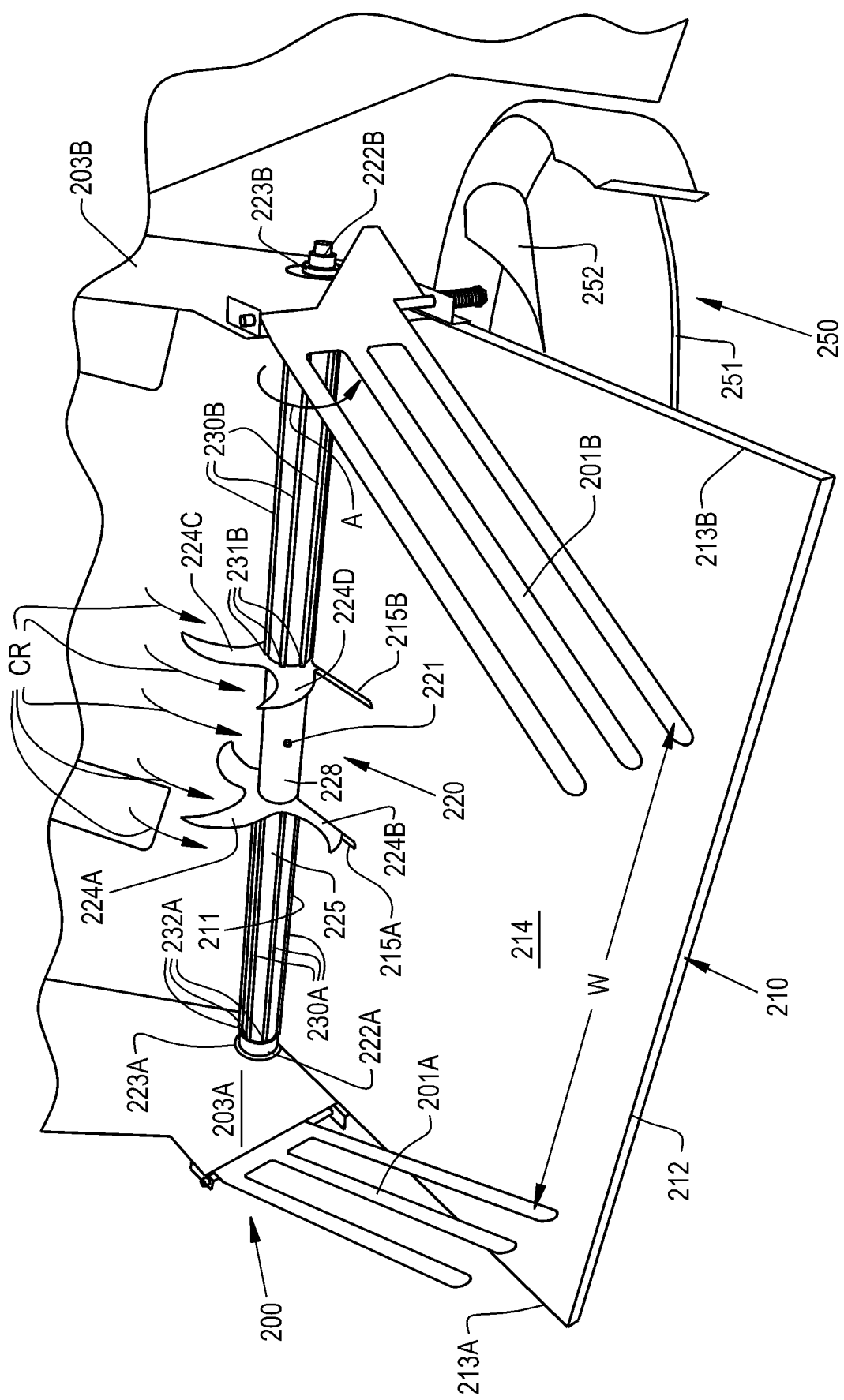
FIG. 2 is a perspective view of an exemplary embodiment of a windrow assembly formed in accordance with an exemplary embodiment of the present invention.

Referring now to FIG. 2, an exemplary embodiment of a windrow assembly 200, which is shown in FIG. 1 as a block, formed according to the present invention is shown which is carried by the chassis 101 and includes a windrow chute 210 defining a leading edge 211 downstream from the chopper 180 and a trailing edge 212 downstream from the leading edge 211. In the instances where the windrow assembly 200 is not mounted to the vehicle 100, the trailing edge 212 can be described as being opposite to the leading edge 211. It should be appreciated that while the windrow assembly 200 is shown as being included in a combine harvester 100, the windrow assembly 200 can also be included in other agricultural vehicles, such as vehicles commonly referred to as "windrowers." The windrow assembly 200 can include a pair of vanes 201A, 201B, with each vane 201A, 201B attached to a respective lateral edge 213A, 213B of the windrow chute 210 to define a windrow width W of the formed windrow between the vanes 201A, 201B. The vanes 201A, 201B may be fixed or pivotable, as desired, to maintain or adjust the windrow width W. As shown, the windrow assembly 200 can be carried above a spreader system 250 which is configured to spread chaff and other small crop residue particles across the field via rotation of one or more spreader discs 251 and one or more attached spreader fins 252.

Figure 2A:
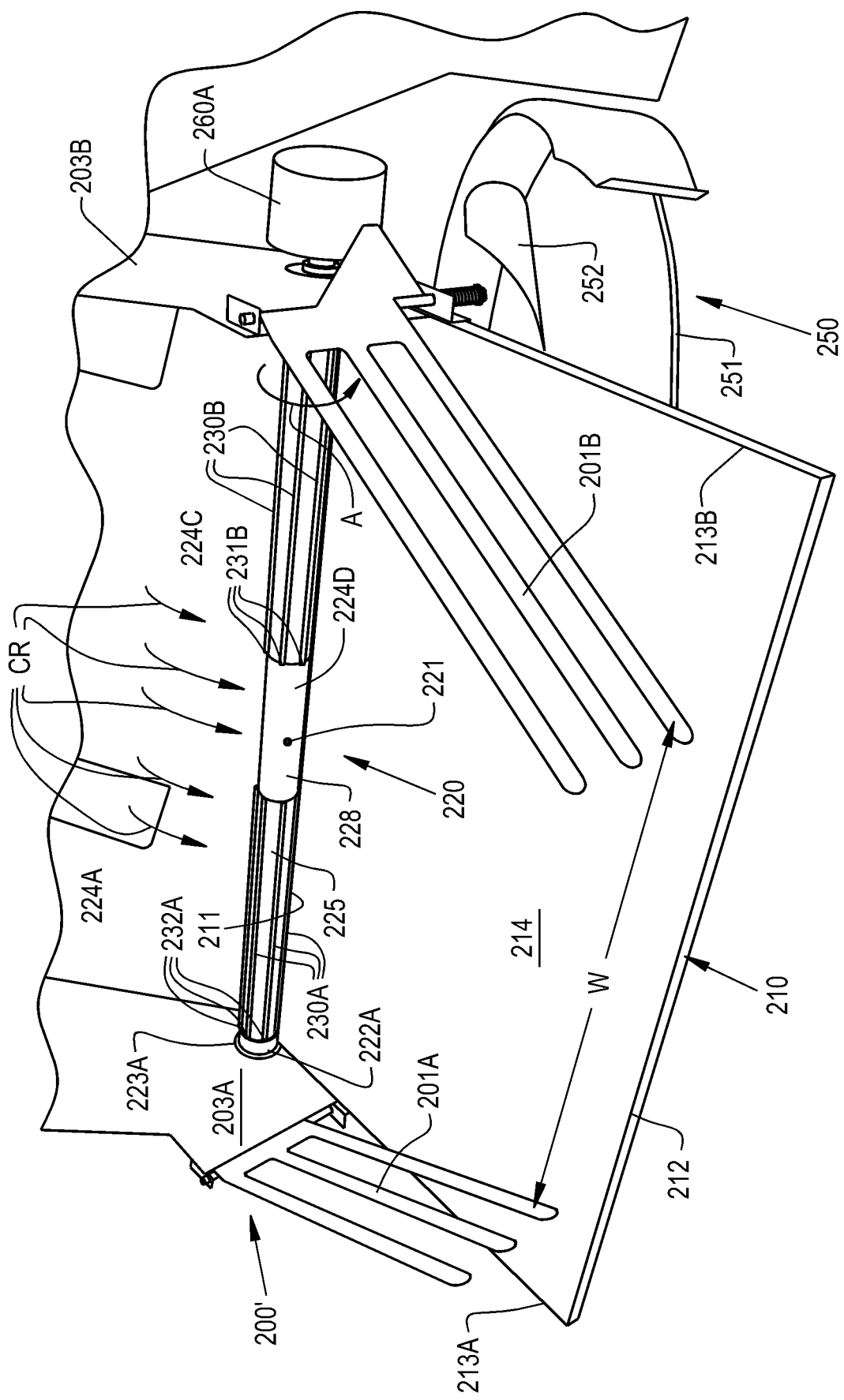
FIG. 2A is a perspective view of a first rotating element for driving a roller of the windrow assembly shown in FIG. 2, in accordance with an exemplary embodiment of the present invention.
Figure 2B:
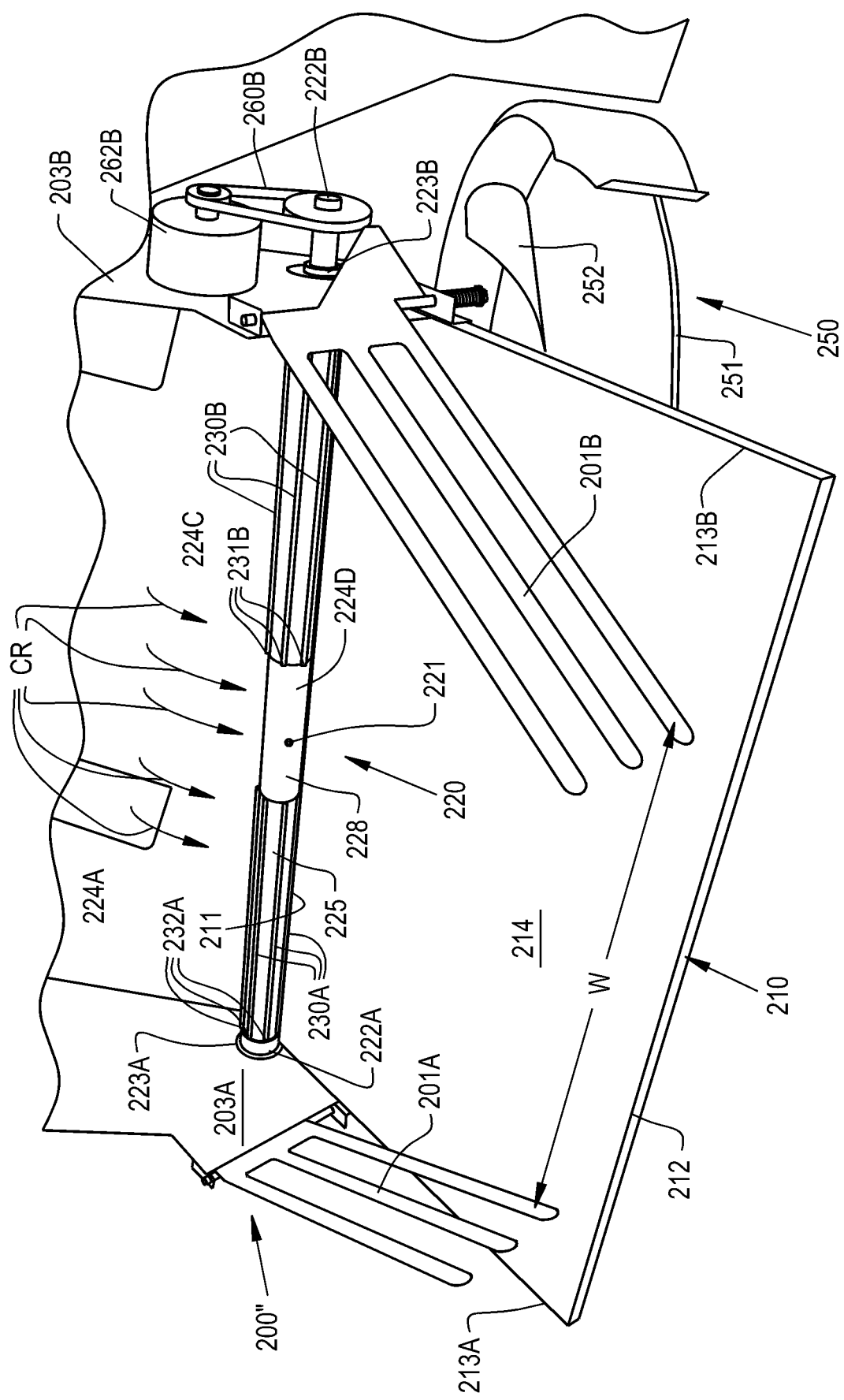
FIG. 2B is a perspective view of a second element for driving the roller of the windrow assembly shown in FIG. 2, in accordance with an exemplary embodiment of the present invention.

The windrow assembly 200 further includes a roller 220 associated with the leading edge 211 so as to form an active leading edge 211 during rotation. As used herein, the leading edge 211 is "active" in the sense that, during operation of the vehicle 100, the roller 220 is placed adjacent to the leading edge 211 such that rotation of the roller 220 in a direction A will tend to move crop residue and material near the leading edge 211 and reduce, if not prevent, material accumulation at the leading edge 211. The roller 220 can, for example, be placed to have a rearmost point 221 on the roller 220 extend past the leading edge 211 of the windrow chute 210 so, during rotation of the roller 220, the crop residue can slide directly off the roller 220 past the leading edge 211 and land on a chute surface 214 of the windrow chute 210 and fall toward the trailing edge 212 before falling off the windrow chute 210. Such an arrangement is in contrast to static leading edges, which do not have any movement at the leading edge and present a frequent point of crop residue accumulation. The roller 220 can have a pair of lateral ends 222A, 222B and bearings 223A, 223B attached to side sheets 203A, 203B of the windrow assembly 200 to allow the roller 220 to rotate. The roller 220 can free-wheel in the direction A, as further described herein, so the roller 220 can rotate without needing to be coupled to a rotating element. Alternatively, the roller 220 may be coupled to another rotation element 260A, such as a motor, and powered thereby, as illustrated in an exemplary alternative embodiment of the windrow assembly illustrated in FIG. 2A and generally designated as 200'. As another alternative, the roller 220 may be coupled to a belt 260B coupled to a motor 262B and powered thereby, as illustrated in another exemplary alternative embodiment of the windrow assembly 200, illustrated in FIG. 2B and generally designated as 200".

Figure 3:
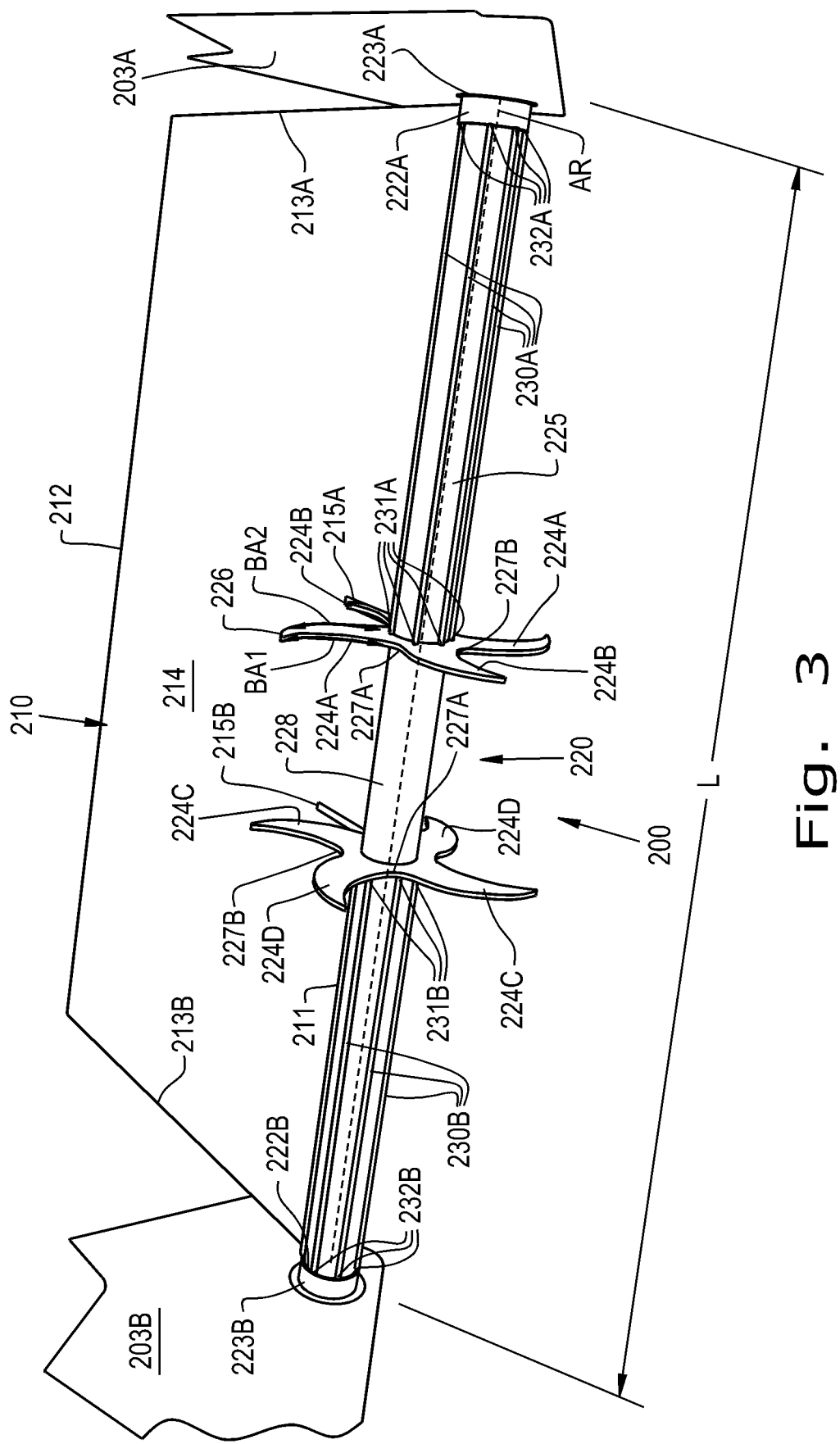
FIG. 3 is a perspective view of the windrow assembly shown in FIG. 2 separate from the agricultural vehicle.

The roller 220 can optionally include one or more blades 224A, 224B, 224C, 224D attached to a circumferential surface 225 of the roller 220 which are aligned with one or more blade openings 215A, 215B formed in the chute surface 214. As can be seen, the blades 224A and 224B, which can be referred to as a first blade 224A and an additional blade 224B, can be aligned circumferentially on the circumferential surface 225 so that the blades 224A, 224B pass through the aligned blade opening 215A during rotation of the roller 220. Similarly, the blades 224C and 224D can be aligned circumferentially on the circumferential surface 225 so that the blades 224C, 224D pass through the aligned blade opening 215B during rotation of the roller 220. The blades 224A, 224B, 224C, 224D can be placed in a crop residue flow stream, signified by arrows CR, so crop residue flowing past the blades 224A, 224B, 224C, 224D will push on the blades 224A, 224B, 224C, 224D and cause the roller 220 to reactively rotate. In this sense, the blades 224A, 224B, 224C, 224D allow the roller 220 to free-wheel and rotate without the need for coupling to another rotation element by utilizing the crop residue flow stream CR to turn the roller 220. Referring specifically now to FIG. 3, it can be seen that one or more of the blades 224A, 224B, 224C, 224D, such as blade 224A, can be formed as one or more arcs BA1, BA2 which converge at a point 226 of the blade 224A directed away from the leading edge 211 and trailing edge 212 of the windrow chute 210. Further, the aligned blades 224A and 224B can be alternating relatively long blades 224A and short blades 224B and the aligned blades 224C and 224D can also be alternating relatively long blades 224C and short blades 224D to form first crop gripping grooves 227A and second crop gripping grooves 227B with different shapes.

Referring to FIGS. 2 and 3, it can be seen that the roller 220 can optionally include one or more beater rods 230A, 230B attached to the circumferential surface 225. The roller 220 defines an axis of rotation AR and the beater rods 230A, 230B can extend generally parallel to the axis of rotation AR. The beater rods 230A, which can be referred to as first beater rods, can be spaced apart from one another circumferentially about the circumferential surface 225 and each have a first end 231A attached to one of the aligned blades 224A, 224B and a second end 232A attached to the lateral end 222A of the roller 220. Similarly, the beater rods 230B, which can be referred to as second beater rods, can be spaced apart from one another circumferentially about the circumferential surface 225 and each have a first end 231B attached to one of the aligned blades 224C, 224D and a second end 232B attached to the lateral end 222B of the roller 220. As the beater rods 230A, 230B extend from the circumferential surface 225, the beater rods 230A, 230B can rub against any crop residue or material that may possibly accumulate between the roller 220 and the leading edge 211 of the windrow chute 210 to loosen and remove the accumulation from the leading edge 211. While the roller 220 is shown with a rodless region 228 between the blades 224A, 224B and blades 224C, 224D, it should be appreciated that the roller 220 can have one or more rods extending across an entire length L of the roller 220.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   a header carried by said chassis and configured to cut crop material;
   a chopper carried by said chassis downstream of said header; and
   a windrow assembly carried by said chassis downstream of said chopper, said windrow assembly including:
   a windrow chute defining a leading edge downstream from said chopper and a trailing edge downstream from said leading edge; and
   a roller associated with said leading edge to form an active leading edge of said windrow chute during rotation, said roller being placed adjacent to said leading edge in a position where a crop residue flow stream originating upstream from said windrow chute falls on top of said roller and configured to reduce material accumulation at said leading edge during rotation.

2. The agricultural vehicle according to claim 1, wherein said roller includes at least one blade attached thereto.

3. The agricultural vehicle according to claim 2, wherein said windrow chute defines a chute surface having at least one blade opening formed therethrough which is aligned with said at least one blade.

4. The agricultural vehicle according to claim 3, wherein said at least one blade comprises a plurality of blades and said at least one blade opening comprises a plurality of blade openings, each of said plurality of blade openings being aligned with at least one of said plurality of blades.

5. The agricultural vehicle according to claim 2, wherein said at least one blade comprises a first blade and at least one additional blade circumferentially aligned with said first blade.

6. The agricultural vehicle according to claim 5, wherein said first blade and said at least one additional blade each define at least one arc projecting from said roller and include a point directed away from said leading edge and said trailing edge.

7. The agricultural vehicle according to claim 2, wherein said roller defines a circumferential surface and includes at least one beater rod attached to said circumferential surface.

8. The agricultural vehicle according to claim 7, wherein said roller defines an axis of rotation and said at least one beater rod extends generally parallel to said axis of rotation, said at least one beater rod including a first end attached to said at least one blade and a second end attached to a lateral end of said roller.

9. The agricultural vehicle according to claim 1, wherein said roller defines a circumferential surface and includes at least one beater rod attached to said circumferential surface.

10. The agricultural vehicle according to claim 9, wherein said roller defines an axis of rotation and said at least one beater rod extends generally parallel to said axis of rotation.

11. The agricultural vehicle according to claim 1, wherein said roller is at least one of configured to free-wheel as crop material passes thereby and coupled to another rotational element.

12. The agricultural vehicle according to claim 1, further comprising a spreader system carried below said windrow assembly and comprising a spreader disc and at least one spreader fin attached to said spreader disc.

* * * * *